United States Patent Office 2,770,665
Patented Nov. 13, 1956

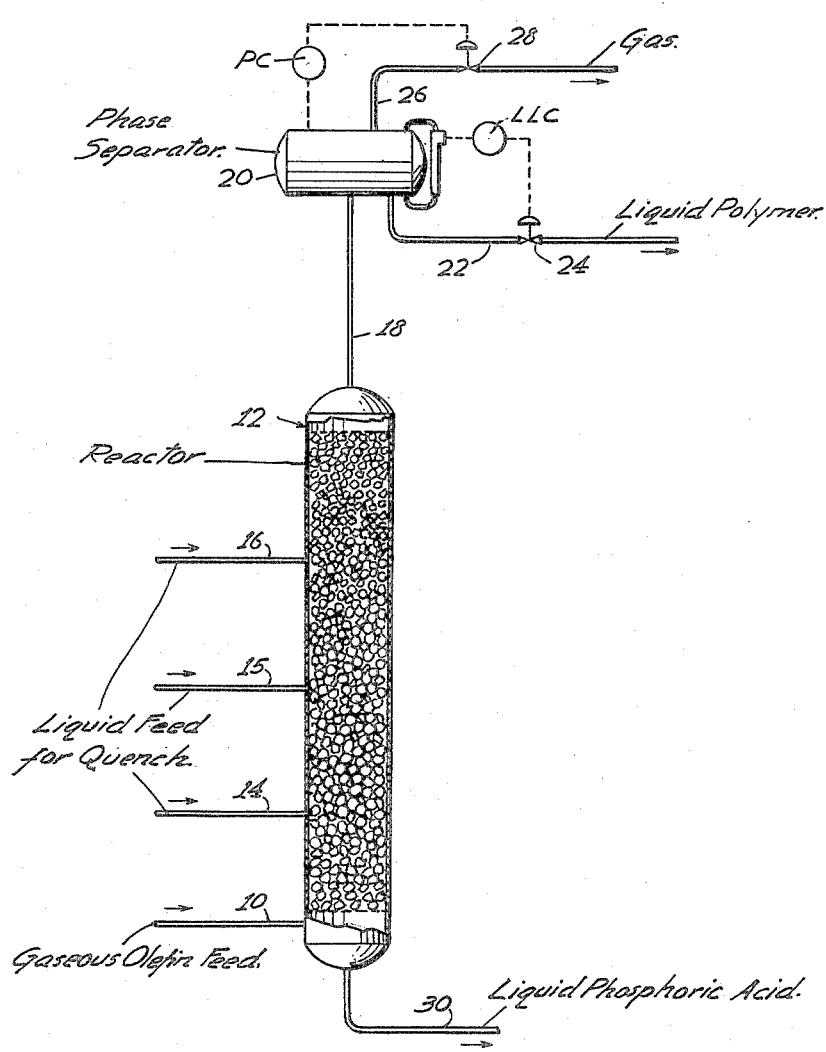

2,770,665

POLYMERIZATION PROCESS FOR PREPARING PROPYLENE TETRAMER

Lawrence H. Corn, Canonsburg, Pa., assignor to Gulf Oil Corporation, Pittsburgh, Pa., a corporation of Pennsylvania Application September 12, 1952, Serial No. 309,333

2 Claims. (Cl. 260—683.15)

This invention relates to a polymerization process and more particularly to a process for polymerizing gaseous olefins to a normally liquid polymerization product.

Polymerization of normally gaseous olefins to normally liquid products such as products boiling in the range of gasoline or light naphtha became economically feasible with the widespread production of olefins containing from 2 to 5 carbon atoms as a by-product of petroleum refining operations, such as cracking. The gasolines produced by modern polymerization methods comprise high antiknock motor fuels, suitable for high compression engines.

Moreover, certain liquid polymers produced by polymerization methods have other uses than as a motor fuel. In particular, propylene tetramer is a widely used raw material for the production of surface active agents, such as detergents.

Widespread use has been made of phosphoric acid polymerization catalysts. For example, solid phosphoric acid has found widespread use as a polymerization catalyst. More recently, polymerization catalysts comprising a thin film of phosphoric acid adsorbed on a non-porous inert support such as quartz have gained commerical acceptance. The preparation of such a catalyst is set forth in United States Patent No. 2,186,021 to Melvin M. Holm and William H. Shiffler which issued on January 9, 1940.

Polymerization processes utilizing either of the aforementioned phosphoric acid polymerization catalysts are highly exothermic, and the heat of polymerization must be regulated. Otherwise, the course of the polymerization cannot satisfactorily be controlled, and the production of polymers of requisite specific characteristics cannot be secured.

Another problem encountered in polymerization processes employing phosphoric acid polymerization catalysts is that of securing the proper degree of polymerization. For example, prior processes directed to the manufacture of propylene tetramer have encountered the difficulty that large amounts of light polymer products are formed in the course of the polymerization. Thus, in a conventional polymerization process for the manufacture of propylene tetramer in which propylene is introduced into the top portion of a reactor containing phosphoric acid polymerization catalyst and liquid polymer product withdrawn from the bottom portion of the reactor, a high percentage of propylene dimer and trimer is formed. These light polymer products must be recycled to the reactor to form the desired propylene tetramer.

The process of my invention relates to a catalytic polymerization processes in which the polymerization of normally gaseous olefins to a normally liquid polymerization product is effected through contact with a phosphoric acid polymerization catalyst under conditions where the heat of polymerization can be regulated, and where the necessity of recycling light polymers to form a desired heavier polymer product is obviated. A gas comprising normally gaseous olefins is passed upwardly through a reactor containing a bed of phosphoric acid polymerization catalyst under polymerization conditions of temperature and pressure to form the desired normally liquid polymer product. It is essential in the process of my invention that the reactor be maintained substantially full of liquid polymers, and that the liquid polymer product be withdrawn from the top portion of the reactor. In a preferred embodiment of the process of my invention the phosphoric acid polymerization catalyst consists of a thin film of phosphoric acid adsorbed on a non-porous inert support. In particular, the process of my invention provides a facile method for preparing propylene tetramer from propylene.

The process of my invention can be more readily understood by reference to the accompanying figure which comprises a diagrammatic representation of a system suitable for the process of my invention. The accompanying figure is hereby incorporated into my application and made a part thereof. I shall present as an example of the process of my invention the preparation of propylene tetramer from propylene. However, it is to be understood that the process of my invention can be employed for the preparation of other normally liquid polymer products from propylene, or from other normally gaseous olefins, such as butenes, or mixtures of normally gaseous olefins.

Referring to the accompanying figure, an olefinic gaseous feed consisting essentially of propylene is introduced into the system by means of line 10. It is frequently desirable to purify the feed prior to introducing it into the system. Many olefinic gaesous feeds derived from petroleum cracking contain varying quantities of compounds which may either poison the catalyst or contaminate the product or both, and accordingly it is desirable to rid the feed of such compounds. This can advantageously be accomplished by scrubbing the feed successively with appropriate non-reactive dilute acid and alkaline solutions before the feed is brought to the required equilibrium water vapor pressure. I shall discuss below the need for humidifying the feed to bring it to a given equilibrium water vapor pressure. In cases where it is necessary to dry the olefinic gaseous feed to attain the desired water content, drying treatment with calcium chloride, barium perchlorate, or other inert dessicant can be effected. The feed passes upwardly through polymerization reactor 12 containing a bed of phosphoric acid polymerization catalyst consisting of a thin film of phosphoric acid adsorbed on quartz. It is desirable that the catalyst be particulated to a mesh size of the order of 4 mesh or smaller, in the instant case a mesh size of the order of 28 to 35 is utilized. The olefinic gaseous feed is introduced into polymerization reactor 12 at a temperature of about 300° to 400° F., such as 320° F. Polymerization reactor 12 is maintained at about the same temperature and is under a pressure of about 250 to 400 pounds per square inch. Polymerization reactor 12 is maintained substantially full of liquid polymerization products such as propylene dimer, propylene trimer, and propylene tetramer. In the preferred form of the invention illustrated, effective control of the reaction temperature is maintained by introducing olefinic feed, preferably of substantially the same composition as the feed at the bottom of the reactor 12, which has been cooled to a suitable temperature, such as approximately 100° F., and liquefied, into the reactor 12 through lines 14, 15, and 16. Vaporization of the liquefied olefinic feed thus introduced consumes the heat of polymerization and thus maintains the temperature of the reactor within the desired range.

Under the afore-mentioned conditions the light propylene polymers such as the dimer and trimer initially formed from the contact of the propylene with the catalyst will remain in polymerization reactor 12 for a longer period than in prior art processes in which the feed is introduced at the top of the polymerization reactor and the liquid polymer product withdrawn from the reactor bottom. The residence time of the light liquid polymers can be regulated in polymerization reactor 12 by controlling the feed introduction rate. The degree of polymerization is thereby regulated so that substantially propylene tetramer is withdrawn from the top portion of the polymerization reactor. The gaseous propylene remains in solution in the light polymer products until it undergoes polymerization, and accordingly, little unreacted propylene escapes from the top of polymerization reactor 12.

The rate and the degree of polymerization can be controlled by regulating the water content of the equilibrium mixture of propylene and propylene polymers within polymerization reactor 12. This is advantageously effected by regulating the water content of the feed entering polymerization reactor 12 through lines 10, 14, 15 and 16. It has been found that there is an optimum partial water vapor pressure for the feed which is in turn dependent upon the optimum vapor pressure of the catalyst at any given polymerization reaction temperature. Thus, optimum activity and product yields can be secured by maintaining the vapor pressure of the catalyst at an optimum level throughout any given polymerization run. Adjustment of the water vapor pressure of the feed along the afore-mentioned lines is well known to those skilled in the art and does not form a part of my invention. An approximate method for determining the requisite water vapor content of the feed is set forth in United States Patent No. 2,135,793 to Lloyd F. Brooke which issued on November 8, 1938.

The propylene tetramer product plus a minor amount of unreacted propylene is withdrawn from the top portion of polymerization reactor 12 through line 18 and passed to phase separator 20. Phase separator 20 separates the propylene tetramer product from the unreacted propylene gas. The former is withdrawn from phase separator 20 through line 22 and valve 24. The latter is withdrawn from phase separator 20 by means of line 26 and valve 28. Minor amounts of liquid phosphoric acid which are released from the catalyst during the course of the reaction can be withdrawn from the bottom of polymerization reactor 12 through line 30. After polymerization reactor 12 has been on-stream for a protracted period, regeneration of the catalyst is effected. This can readily be accomplished by washing the acid from the quartz with water, followed by a simple washing of the quartz support with an appropriate solvent for tars and gums, steaming out residual solvent, and replacing the acid. The foregoing can advantageously be accomplished in situ in polymerization reactor 12. Other regeneration procedures can be utilized, such as burning off tars and gums, although such burning operations are ordinarily not necessary.

It is obvious that my invention may be modified by one skilled in the art, and it is to be understood that these modifications which are readily apparent to one skilled in the art are to be included within my invention and thereby made a part of the appended claims. By way of example, these modifications include varying process variables such as temperature, pressure, degree of humidity, etc., in accordance with the established practice within the art directed to phosphoric acid polymerization. As I have shown, the process of my invention may be applied to a polymerization reactor containing a bed of phosphoric acid polymerization catalyst consisting of a thin film of phosphoric acid adsorbed on a non-porous inert support.

It is to be understood that other forms of reactors and other types of phosphoric acid polymerization catalysts can also be utilized for the process of my invention. Thus, a reactor comprising a plurality of narrow tubes containing solid phosphoric acid catalyst, which tubes are surrounded by a heat-exchange medium can also be utilized in the process of my invention. In another embodiment of this invention, liquid propane or a similar substance may be introduced through lines 14, 15, and 16 to aid in the control of the reaction temperature. However, the embodiment of my invention employing a phosphoric acid polymerization catalyst consisting of a thin film of phosphoric acid adsorbed on a non-porous inert support such as quartz is to be preferred, inasmuch as the use of this catalyst permits the extent of polymerization to be controlled to a high degree of exactness. Moreover, this catalyst is less costly than solid phosphoric acid catalyst and is not subject to powdering losses.

The process of my invention permits the polymerization of normally gaseous hydrocarbons to a normally liquid polymer product without the need for recycling light polymer intermediates. In the case of the preparation of propylene tetramer from propylene, the polymerization can readily be effected without the necessity of recycling propylene dimer or propylene trimer. Recycling procedures add to the initial cost of the equipment because of the necessity of recycle lines and pumps and the additional material circulated through the reactor for a given production. Additionally, recycling causes an increase in operating costs because of the drop in pressure through the reactor and other equipment and the necessity of pumping the recycled material back through the reactor.

Obviously many modifications and variations of the invention, as hereinbefore set forth, may be made without departing from the spirit or scope thereof and therefore only such limitations should be imposed as are indicated in the appended claims.

I claim:

1. A process for the preparation of propylene tetramer which comprises passing a gas consisting essentially of propylene upwardly through a reactor containing a fixed bed of phosphoric acid polymerization catalyst consisting of a thin film of phosphoric acid adsorbed on quartz particles having a particle size smaller than 4 mesh at a temperature of about 300° to 400° F. and a pressure of about 250 to 400 pounds per square inch to form liquid propylene tetramer, maintaining said reactor full of liquid propylene polymers, and withdrawing said liquid propylene tetramer from the top portion of the reactor.

2. A process for the preparation of propylene tetramer comprising passing a feed stock consisting essentially of propylene in the gaseous state at a temperature of about 300° F. to 400° F. into the lower end of a reactor containing a fixed bed of an acid film polymerization catalyst of phosphoric acid on a solid support, maintaining the reactor full of liquid polymers of propylene at a temperature of about 300° F. to 400° F. and at a pressure of about 250 to 400 pounds per square inch in contact with the catalyst bed to convert lower polymers of propylene to propylene tetramer, passing the feed stock upwardly through the reactor to form liquid polymers of propylene, introducing liquid feed stock into the reactor between the point of introduction of the gaseous feed stock and the upper end of the catalyst bed as quench to control the temperature in the reactor, and withdrawing liquid propylene tetramer from the upper end of the reactor.

References Cited in the file of this patent

UNITED STATES PATENTS

| | | |
|---|---|---|
| 2,186,022 | Holm et al. | Jan. 9, 1940 |
| 2,348,836 | Nagle | May 16, 1944 |
| 2,592,428 | Kemp et al. | Apr. 8, 1952 |
| 2,626,292 | Gornowski | Jan. 20, 1953 |